United States Patent
Frank et al.

(10) Patent No.: US 10,384,527 B2
(45) Date of Patent: Aug. 20, 2019

(54) FOUR WHEEL DRIVE POWERTRAIN CONFIGURATIONS FOR TWO-MOTOR, TWO-CLUTCH HYBRID ELECTRIC VEHICLES

(71) Applicant: CUMMINS ELECTRIFIED POWER NA INC., Wilmington, DE (US)

(72) Inventors: Andrew Frank, Davis, CA (US);
Chan-Chiao Lin, Dixon, CA (US);
Patrick Kaufman, Dixon, CA (US);
Julio Razo, Dixon, CA (US)

(73) Assignee: Cummins Electrified Power NA Inc., Wilmington, DE (US)

( * ) Notice: Subject to any disclaimer, the term of this patent is extended or adjusted under 35 U.S.C. 154(b) by 0 days.

(21) Appl. No.: 13/914,295

(22) Filed: Jun. 10, 2013

(65) Prior Publication Data

US 2014/0228167 A1     Aug. 14, 2014

Related U.S. Application Data

(63) Continuation-in-part of application No. 13/762,731, filed on Feb. 8, 2013, now Pat. No. 9,045,136, and a
(Continued)

(51) Int. Cl.
*B60W 20/20* (2016.01)
*B60K 6/442* (2007.10)
*B60K 6/52* (2007.10)

(52) U.S. Cl.
CPC .............. *B60K 6/442* (2013.01); *B60K 6/52* (2013.01); *B60W 20/20* (2013.01);
(Continued)

(58) Field of Classification Search
USPC .............. 180/65.235, 65.265, 65.28, 65.285
See application file for complete search history.

(56) References Cited

U.S. PATENT DOCUMENTS 5,343,970 A    9/1994  Severinsky
5,845,731 A *  12/1998  Buglione et al. .......... 180/65.23
(Continued)

FOREIGN PATENT DOCUMENTS

CN   102381177 A   3/2012
CN   204136757 U   2/2015
(Continued)

OTHER PUBLICATIONS

Adel, B et af., "Simulation and Comparison of HEY Battery Control for Best Fuel Economy and Longer Battery Life", World Electric Vehicle Journal, ISSN 2032-6653, Nov. 5-9, 2010, vol. 4, pp. 000421-0\)0426 [online], [retrieved on Mar. 5, 2014]. Retrieved from the Internet: <URL: http://www.evs24.org/wevajournallphp/download.php?f=voi4/WEVA4-4060.pdf>; introduction.

(Continued)

*Primary Examiner* — Jeffrey J Restifo
(74) *Attorney, Agent, or Firm* — Faegre Baker Daniels LLP

(57) ABSTRACT

Four Wheel Drive (4WD) powertrain configurations for hybrid electric vehicles (HEV) and plug-in hybrid electric vehicles (PHEV) are disclosed herein. One powertrain comprises: a prime mover; an electric motor-generator, said electric motor-generator mechanically coupled to said prime mover via a first clutch; an electric motor, said electric motor mechanically coupled to said electric motor-generator via a second clutch; a battery, said battery electrically coupled to said electric motor-generator and said electric motor, said battery capable of supplying electrical energy to said electric motor-generator and said electric motor; and a controller, said controller capable of supplying control signals to said prime mover, said first clutch, said electric motor-generator, said second clutch and said electric motor such that said controller is capable of dynamically affecting a plurality of (Continued)

operating modes; wherein further said plurality of operating modes comprises one of a group, said group comprising: all electric mode, series mode, series-parallel mode and parallel mode.

14 Claims, 12 Drawing Sheets

Related U.S. Application Data continuation-in-part of application No. 13/762,860, filed on Feb. 8, 2013, now Pat. No. 6,421,856.

(52) U.S. Cl.
CPC .... *B60W 2720/403* (2013.01); *Y02T 10/6234* (2013.01); *Y02T 10/6265* (2013.01); *Y02T 10/6269* (2013.01); *Y02T 90/14* (2013.01); *Y10S 903/946* (2013.01); *Y10T 477/26* (2015.01)

(56) References Cited

U.S. PATENT DOCUMENTS

| | | | |
|---|---|---|---|
| 5,856,709 A | 1/1999 | Ibaraki | |
| 5,982,045 A | 11/1999 | Tabata | |
| 6,026,921 A * | 2/2000 | Aoyama et al. | 180/65.25 |
| 6,048,289 A * | 4/2000 | Hattori et al. | 477/15 |
| 6,054,844 A | 4/2000 | Frank | |
| 6,081,042 A | 6/2000 | Tabata | |
| 6,083,139 A * | 7/2000 | Deguchi et al. | 477/5 |
| 6,116,363 A * | 9/2000 | Frank | 180/65.25 |
| 6,190,282 B1 * | 2/2001 | Deguchi et al. | 477/5 |
| 6,328,122 B1 | 12/2001 | Yamada | |
| 6,432,023 B1 * | 8/2002 | Ahner et al. | 477/5 |
| 6,569,055 B2 * | 5/2003 | Urasawa et al. | 477/5 |
| 6,740,002 B1 | 5/2004 | Stridsberg | |
| 6,809,429 B1 | 10/2004 | Frank | |
| 6,837,215 B2 | 1/2005 | Nishigaki et al. | |
| 6,847,189 B2 | 1/2005 | Frank | |
| 6,885,113 B2 | 4/2005 | Lim | |
| 6,886,648 B1 * | 5/2005 | Hata et al. | 180/65.235 |
| 6,931,850 B2 | 8/2005 | Frank | |
| 6,991,054 B2 * | 1/2006 | Takaoka et al. | 180/65.235 |
| RE39,023 E * | 3/2006 | Sasaki | 318/140 |
| 7,021,409 B2 | 4/2006 | Tamor | |
| 7,040,433 B2 * | 5/2006 | Yamamoto et al. | 180/65.225 |
| 7,117,963 B2 * | 10/2006 | Saito et al. | 180/65.1 |
| 7,154,236 B1 * | 12/2006 | Heap | 318/9 |
| 7,163,480 B2 * | 1/2007 | Supina et al. | 475/5 |
| 7,169,074 B2 * | 1/2007 | Raghavan et al. | 475/5 |
| 7,196,430 B2 * | 3/2007 | Yang | 290/40 C |
| 7,217,205 B2 | 5/2007 | Frank | |
| 7,249,537 B2 | 7/2007 | Lee et al. | |
| 7,261,672 B2 | 8/2007 | Frank | |
| 7,315,090 B2 * | 1/2008 | Yang | 290/40 C |
| 7,467,678 B2 * | 12/2008 | Tanaka et al. | 180/65.265 |
| 7,597,164 B2 * | 10/2009 | Severinsky et al. | 180/65.27 |
| 7,632,202 B2 * | 12/2009 | Supina et al. | 475/5 |
| 7,713,166 B2 | 5/2010 | Frank | |
| 7,740,119 B2 | 6/2010 | Staudinger | |
| 7,908,067 B2 * | 3/2011 | Soliman et al. | 701/54 |
| 8,028,778 B2 * | 10/2011 | Luo et al. | 180/65.22 |
| 8,056,663 B2 | 11/2011 | Schoenek | |
| 8,057,354 B2 | 11/2011 | Frank | |
| 8,062,172 B2 * | 11/2011 | Supina et al. | 477/3 |
| 8,083,016 B2 * | 12/2011 | Naik et al. | 180/65.23 |
| 8,152,671 B2 | 4/2012 | Tiwari | |
| 8,215,425 B2 * | 7/2012 | Hayashi et al. | 180/65.265 |
| 8,215,426 B2 * | 7/2012 | Katsuta et al. | 180/65.265 |
| 8,234,025 B2 | 7/2012 | Conlon | |
| 8,251,850 B2 | 8/2012 | Phillips | |
| 8,307,924 B2 * | 11/2012 | Wang et al. | 180/65.23 |
| 8,474,556 B2 * | 7/2013 | Wang et al. | 180/65.22 |
| 8,540,601 B2 * | 9/2013 | Wang et al. | 477/5 |
| 8,833,324 B2 * | 9/2014 | O'Brien et al. | 123/179.22 |
| 8,845,482 B2 | 9/2014 | Zhang et al. | |
| 8,997,480 B1 | 4/2015 | Bennett | |
| 9,045,136 B2 | 6/2015 | Frank et al. | |
| 9,421,856 B2 | 8/2016 | Frank et al. | |
| 2001/0039230 A1 | 11/2001 | Severinsky et al. | |
| 2006/0048983 A1 | 3/2006 | Urakabe | |
| 2007/0276556 A1 | 11/2007 | Houle | |
| 2008/0096717 A1 | 4/2008 | Houle | |
| 2008/0223636 A1 | 9/2008 | Gutsche | |
| 2008/0223637 A1 | 9/2008 | Bartilson | |
| 2009/0145674 A1 | 6/2009 | Lee | |
| 2009/0221390 A1 | 9/2009 | Houle | |
| 2010/0099532 A1 | 4/2010 | Cashen | |
| 2011/0287888 A1 | 11/2011 | Muller | |
| 2011/0305550 A1 | 12/2011 | Haire | |
| 2012/0077632 A1 | 3/2012 | Babbitt et al. | |
| 2012/0198962 A1 | 8/2012 | Houle | |
| 2012/0309587 A1 | 12/2012 | Nozaki | |
| 2013/0138283 A1 * | 5/2013 | Cho | 701/22 |
| 2013/0324357 A1 | 12/2013 | Stenson | |
| 2014/0228167 A1 * | 8/2014 | Frank et al. | 477/5 |
| 2014/0256505 A1 | 9/2014 | Dalum et al. | |
| 2018/0118187 A1 | 5/2018 | Frank et al. | |

FOREIGN PATENT DOCUMENTS

| | | |
|---|---|---|
| JP | 2011025858 A | 2/2011 |
| WO | WO2009009822 A1 | 1/2009 |
| WO | 2012082063 | 6/2012 |
| WO | 2012152613 | 11/2012 |

OTHER PUBLICATIONS

International Search Report in PCT/US2014/014215.
Written Opinion in PCT/US2014/014215.
International Search Report and Written Opinion in PCT/US2014/014234, dated Aug. 12, 2014.
International Search Report and Written Opinion in PCT/US2014/014251, dated Sep. 26, 2014.
Adel, B. et al., "Simulation and Comparison of HEV Battery Control for Best Fuel Economy and Longer Battery Life", World Electric Vehicle Journal, vol. 4, ISSN 2032-6653, (2010); 6 pages.
International Search Report and Written Opinion issued by the ISA/US, Commissioner for Patents, dated Aug. 12, 2014, for International Application No. PCT/US2014/014234; 14 pages.

* cited by examiner

FOUR WHEEL DRIVE POWERTRAIN CONFIGURATIONS FOR TWO-MOTOR, TWO-CLUTCH HYBRID ELECTRIC VEHICLES

CROSS-REFERENCE TO RELATED APPLICATIONS

The present application is a Continuation In Part (CIP) application of, and takes the benefit of: (1) U.S. patent application Ser. No. 13/762,731 filed on Feb. 8, 2013 and entitled "SYSTEMS AND METHODS FOR IMPLEMENTING DYNAMIC OPERATING MODES AND CONTROL POLICIES FOR HYBRID ELECTRIC VEHICLES"; (2) U.S. patent application Ser. No. 13/762,860 filed on Feb. 8, 2013 and entitled "POWERTRAIN CONFIGURATIONS FOR TWO-MOTOR, TWO-CLUTCH HYBRID ELECTRIC VEHICLES"—all of which are hereby incorporated by reference.

BACKGROUND

In the field of electric vehicles (EVs), hybrid electric vehicles (HEVs) and plug-in hybrid electric vehicles (PHEVs), there are many possible powertrains that may affect a wide variety of operating modes. For example, in the field of HEVs alone, HEV powertrains may be constructed to affect series, parallel, series-parallel modes of operation. In addition, certain of these modes may be constructed to operate according to different policies, —e.g., charge-sustaining, charge-depletion and the like.

These different modes and policies offer certain advantages—e.g., range extension, fuel efficiency, operation of the internal combustion engine (ICE) on its ideal-operating line (IOL). It would be desirable to have a single powertrain that may affect a plurality of these modes—possibly during different drive conditions and possibly with different policies, according to a desired drive characteristic metric, such as fuel efficiency, range extension, efficient battery usage or the like.

In addition, it may be desirable to have a hybrid electric powertrain configuration that has substantially the same form factor for conventional passenger cars and light-to-heavy-duty truck vehicle configurations. In such a case, the cost to produce advanced hybrid electric vehicles may be reduced by substitution without costly changes to the production line.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

Some embodiments of the present application provide for powertrain configurations for hybrid electric vehicles (HEV) and plug-in hybrid electric vehicles (PHEV). In one embodiment, a powertrain comprises: a prime mover; an electric motor-generator, said electric motor-generator mechanically coupled to said prime mover via a first clutch; an electric motor, said electric motor mechanically coupled to said electric motor-generator via a second clutch; a battery, said battery electrically coupled to said electric motor-generator and said electric motor, said battery capable of supplying electrical energy to said electric motor-generator and said electric motor; and a controller, said controller capable of supplying control signals to said prime mover, said first clutch, said electric motor-generator, said second clutch and said electric motor such that said controller is capable of dynamically affecting a plurality of operating modes; wherein further said plurality of operating modes comprises one of a group, said group comprising: all electric mode, conventional combustion engine mode, series mode, series-parallel mode and parallel mode.

In all these embodiments, the two motors are used to replace a mechanical transmission coupled to a standard internal combustion engine (ICE) for torque multiplication. With this embodiment the same torque is supplied to the vehicle without gears, thus the main motor, Traction Motor, is a high torque low corner speed motor and the second motor, Motor/generator, is a high corner speed motor with a lower maximum torque. It is appreciated that both motors can be electronically controlled as a motor or generator at each moment in time. In this way, the 2 motor hybrid electric system can provide the high torque of a geared transmission at low vehicle speeds and the high power and lower torque at high speed of a conventional Internal combustion engine and geared transmission system using only the electric motors with a battery. The IC engine displacement in these hybrid electric vehicles can then be minimized for best fuel economy.

In other embodiments, the powertrain further comprises a housing that contains at least two or more components of the powertrain. One such housing is mechanically mated to the vehicle and provides housing to at least one or more components of the powertrain. Such a housing may provide for structural support for itself or other components in the powertrain, environmental protection, shock protection, electro-magnetic interference protection to such powertrain components.

Other features and aspects of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
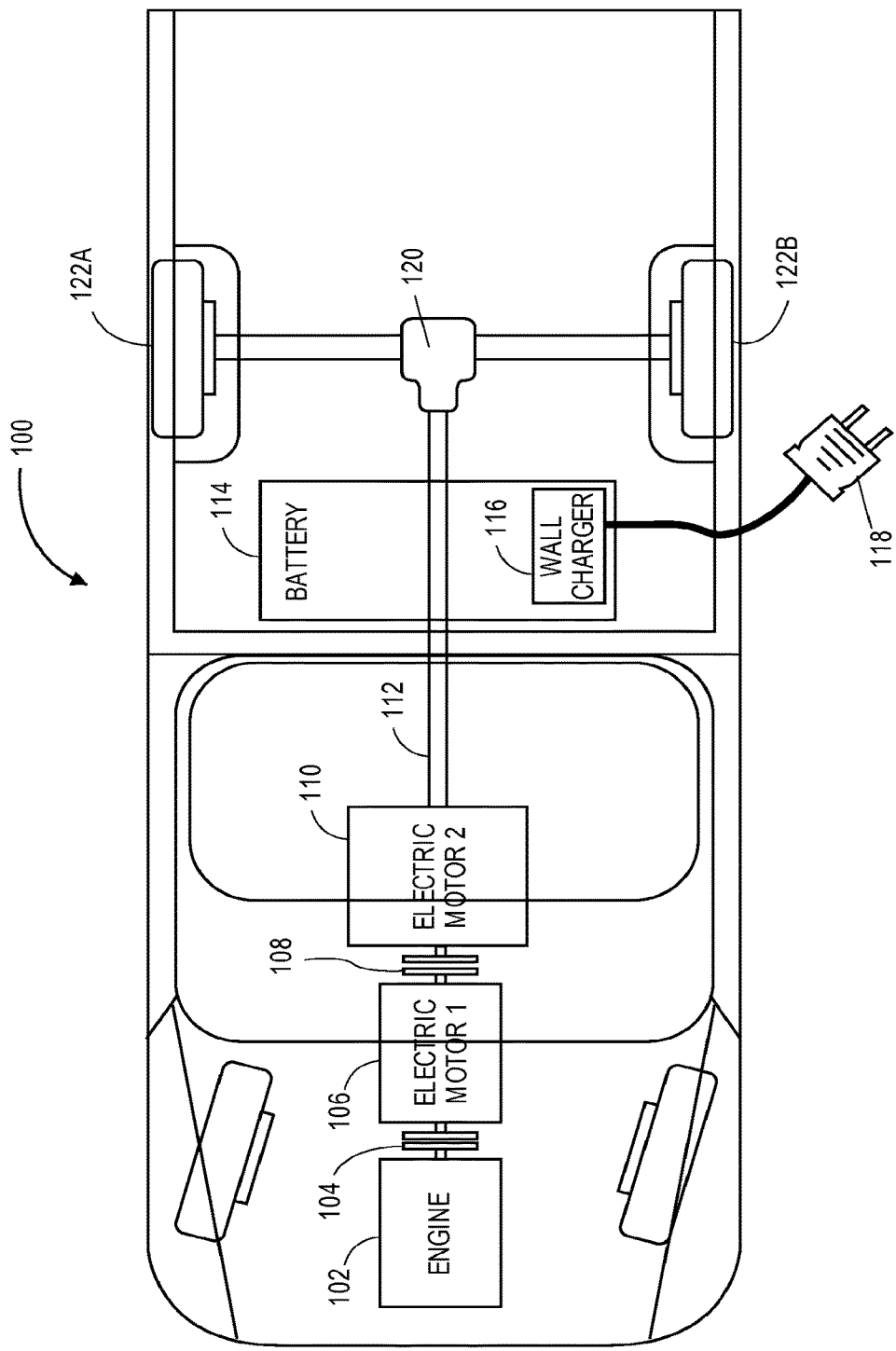
FIG. 1 shows one possible embodiment of a plug-in hybrid electric vehicle, as made according to the principles of the present application.

As utilized herein, terms "controller," "system," "interface," and the like are intended to refer to a computer-related entity, either hardware, software (e.g., in execution), and/or firmware. For example, a controller can be a process running on a processor, a processor, an object, an executable, a program, and/or a computer. By way of illustration, both an application running on a server and the server can be a controller. One or more controllers can reside within a process and a controller can be localized on one computer and/or distributed between two or more computers.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

Introduction

In one embodiment, powertrain configurations are provided herein that comprise a number of components that may further comprise the physical powertrain of Hybrid Electric Vehicles (HEV) and Plug-in Hybrid Electric Vehicles (PHEVs) alike. For example, in many embodiments, there may comprise a gasoline engine, fuel cell or some Prime Mover (PM) that runs on some form of fuel (e.g., gaseous or liquid or the like). In addition, there may be one or more Electric Motors (EM or M) to provide motive power via stored electrical energy in a battery, capacitor, supercapacitor or the like.

For example, FIG. 1 is one possible embodiment of a possible vehicle and/or powertrain platform (100)—among many possible vehicle and/or powertrain embodiments. As shown in FIG. 1, vehicle 100 comprises a dual clutch HEV/PHEV that has the ability to operate as an all-electric vehicle, a hybrid vehicle or a plug-in hybrid electric vehicle. Engine (or any suitable PM) 102 is placed on a common driveshaft 112 with two electric motors 106 and 110. In between engine 102 and motor 106 is clutch 104 and between motor 106 and motor 110 is clutch 108. Clutches 104 and 108, as will be discussed in further detail below, may be actuated in order to affect different modes of operation of vehicle 100.

Battery 114 powers motors 106 and 110 with electric charge. Battery 114 may acquire its electric power via on-board charging (e.g. with engine 102 and motor 106), regenerative braking (e.g. with motor 110, either alone or in combination with motor 106) or via an optional external charger 116. External charger 116 may take electrical energy off an external socket and charger 116 may be designed according to the local standard for grid distribution.

Driveshaft 112 delivers mechanical power to and from final drive 120—which then delivers such power to the wheels 122*a* and 122*b*, which are rear wheels in this embodiment. Final drive 120 may comprise a differential—in optional combination with additional gearing, such as, from a manual transmission, automatic transmission, continuously variable transmission (CVT) whether mechanical or electronic, or power split device (PSD) as is used in the Toyota Prius vehicle. In addition, it should be appreciated that front wheel or all-wheel drive embodiments are also possible embodiments and are under the scope of the present application. Other possible embodiments might include: (1) a front engine/2 motor front wheel drive configuration; (2) a front engine/one or two motor/variable transmission (e.g., CVT, automatic transmission, manual transmission, electronic transmission, planetary gear transmission and the like) configuration; and (3) a front engine/one motor transmission and a rear motor transmission configuration.

In one embodiment, motor 110 may have a higher power rating than motor 106. The power and/or torque rating of the two motors may be adjusted for the application of the vehicle; but in one embodiment, motor 106 may be ½ (or some other proportion) of the power and torque of motor 110 and the PM 102 may be approximately the power of motor 106. In another embodiment—where the All Electric Mode may have a higher performance than under ICE operation—then the ICE and motor 106 can be much smaller than motor 110. Such a vehicle may be used in special circumstances where there is limited charging infrastructure to provide electric energy for all electric operation.

In yet another embodiment, both motors 106 and 110 may be downsized for cost/weight reduction. In such an embodiment, it may be desirable to operate both motors 106 and 110—with clutch 104 closed more often, so that there would be sufficient torque available upon vehicle launch and/or up a desirable grade (e.g., 30% grade). Such sizing of motors may be designed in particular with the size, weight and/or desired functionality (e.g., passenger vehicle, light duty truck, delivery vehicle or the like) of the vehicle in mind.

Figure 2:
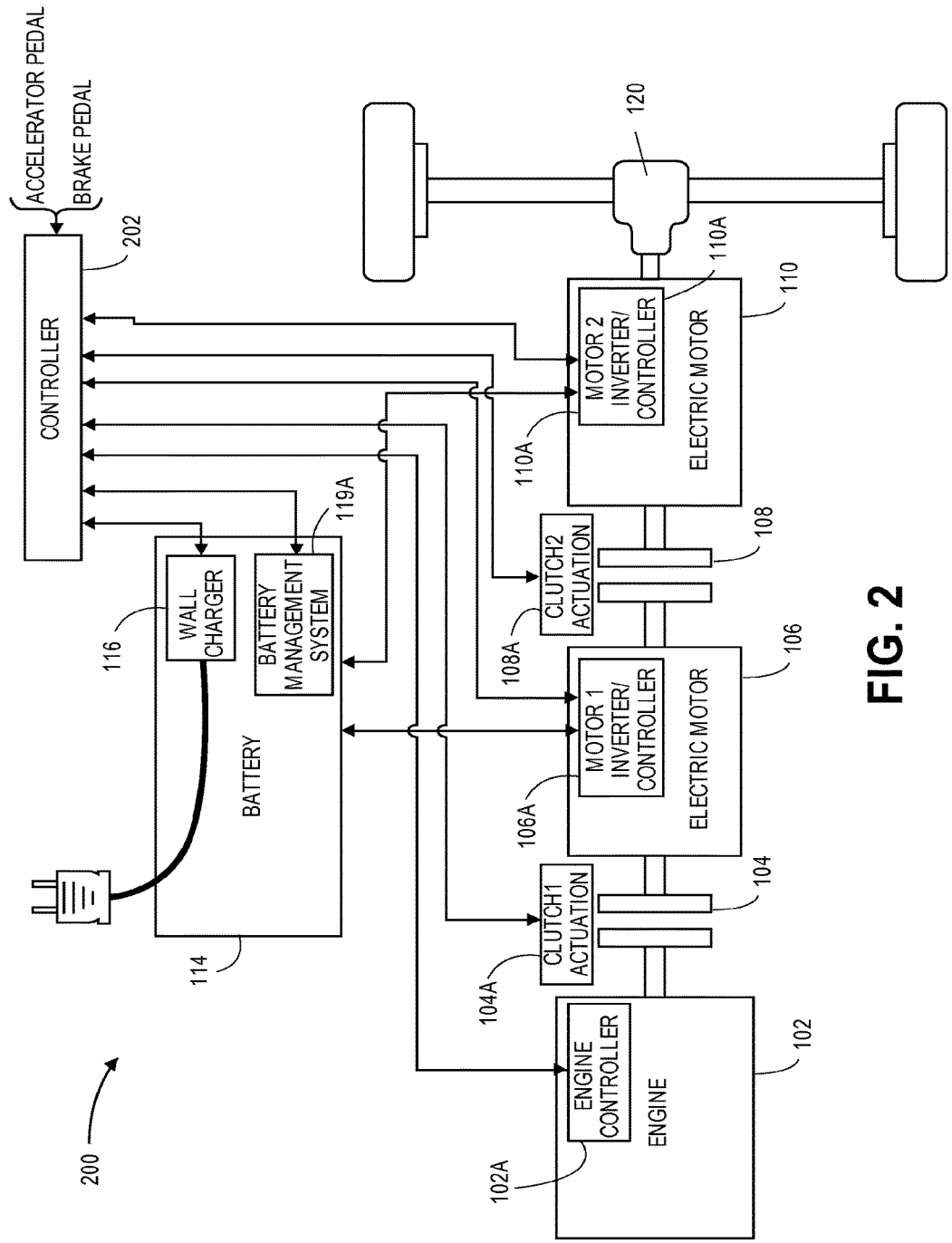
FIG. 2 shows one possible embodiment of an architecture of the powertrain of a plug-in hybrid electric vehicle as made according to the principles of the present application.

FIG. 2 depicts one embodiment of one possible control system 200 for a vehicle and/or powertrain made in accordance with the principles and/or design of FIG. 1. Controller 202 may comprise a suitable combination of hardware, firmware and/or software to input a number of system signals and output a number of control signals to affect the desired operation of vehicle 100. Signals may be input from sensors and/or actuators into controller 202 from a CAN bus architecture, as is known in the art. Possible signals input into controller 202 may comprise: speed of vehicle, speed of drive shaft, speed of crankshaft, state of charge (SOC) of the battery, driver demands via accelerator pedal and brake pedal actuation, clutch slip state, etc.

Other signals for the controller 202 may also include the following:

(1) Outside electric charger information, i.e., Level 1, 2, and other features such as time of charge, Grid to car, car to grid, Charge history, etc.

(2) Battery management system information such as State of Charge (SOC), Temperature of the pack and the individual cells, State of health (SOH), SOC and temperature history, instantaneous power capability, etc.

(3) Engine controller data, such as SOH, fuel use, speed, throttle, temperature, etc.

(4) Clutch 1 data such as, Open/Closed, engine start/series operation, temperature, etc.

(5) Electric motor 1 (M1) data such as, Motor or generating, On/Off, speed, torque, temperature, etc.

(6) Clutch 2 data such as, Open/Closed, M1+M2electric, Engine+M1+M2 parallel, Engine+M1 to M2 Series operation temperature, etc.

(7) Electric motor drive with M2 including data such as one motor drive, 2 motor drive, series operation, parallel operation temperature, etc.

Other system signals and/or control signals may be connected to controller 202 via various interfaces and/or sub-system controllers, such as engine controller 102a, clutch actuations 104a and 108a, motor controllers 106a and 110a, and battery management system 119a. It may be appreciated that controller 202 may input other signals and send control signals from other sensors and/or actuators.

Embodiments of Powertrain Configurations

As shown in FIGS. 1 and 2, a two-motor, two-clutch configuration in a HEV/PHEV may provide the desired drive and efficiency operations for such an advanced vehicle. It may be desirable if the powertrain shown in FIG. 1 had substantially the same form factor as a conventional powertrain. In that case, cost savings may be realized by a manufacturer of such vehicles, if the amount of changes were minimal to switch production from conventional vehicles to advanced HEV/PHEV vehicles.

Figure 3A:
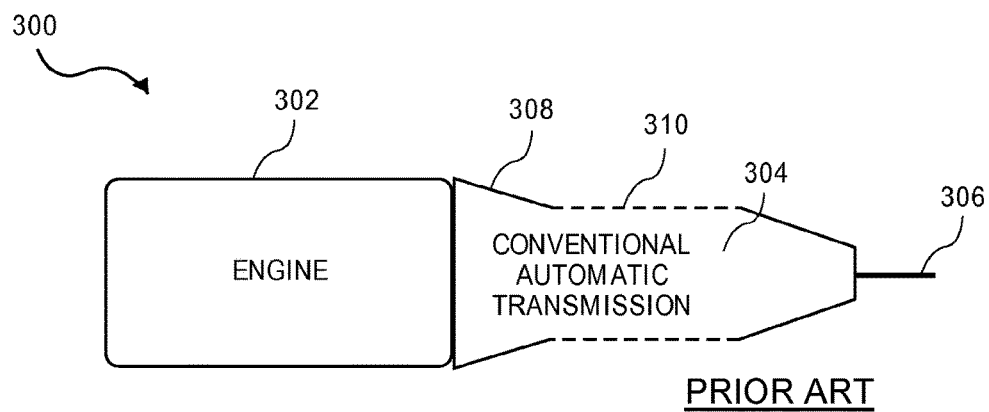
FIGS. 3A and 3B give a side-by-side comparison of a conventional powertrain with a powertrain configuration as made in accordance with the principles of the present application, respectively.
Figure 3B:
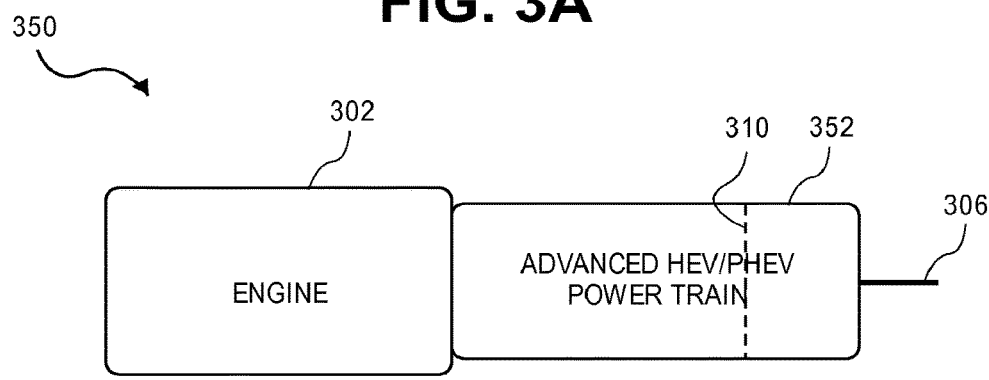

FIGS. 3A and 3B show a side-by side comparison with a conventional powertrain with an advanced powertrain as made in accordance with the principles of the present application, respectively. FIG. 3A shows a conventional powertrain 300 comprising an engine 302 with a conventional automatic (or other type, e.g., manual/CVT/electronic or the like) transmission 304. Drive shaft 306 appears aft of the transmission 304 and extends further back to drive the rear wheels.

Merely for the purposes of exposition, the length dimension of this conventional powertrain may be on the order of 60 inches. This dimension is typical of many different types of vehicles. As may be seen, the automatic transmission has roughly the same cross-sectional area as the engine 302. Often, from the place where the engine mates with the transmission, the transmission exhibits a slight taper 308 to middle section 310 having a middle cross-section.

FIG. 3B depicts a powertrain configuration as made in accordance with the principles of the present application. Powertrain 350 may comprise an engine 302—which may be sized differently for the powertrain 350, as it might be for powertrain 300. In one embodiment, the engine for the HEV/PHEV may be downsized in power as well as size, as the electric motors together with the engine provide sufficient peak power and/or torque—e.g., if powertrain 350 were to be placed in the same vehicle bed as powertrain 300 as a substitute.

As may be seen in FIG. 3B, advanced HEV/PHEV powertrain 350 replaces the conventional transmission (e.g., automatic or manual) 300 in the powertrain configuration. If advanced powertrain 350 is designed to substitute for conventional powertrain 300 designed for a particular vehicle and/or truck, then it would be desirable to design powertrain 350 to fit properly—i.e., on the undercarriage of the vehicle—with all of the appropriate mounts that might be found on powertrain 300 to hold powertrain 350 sufficiently in place.

The following are embodiments of particular powertrains that are specified according to vehicle class:

| Vehicle Type (GVW) | Engine Displacement, Power, Torque | Traction Motor (kW) | Motor/Generator (kW) | Battery Capacity (kWh) |
| --- | --- | --- | --- | --- |
| Heavy Duty Truck (14,000 to 26,000 lbs) | 14.8 L, 376 kW @1800 rpm, 2400 Nm@1100 rpm | >900 Nm peak, >100 kW peak, Max speed >3000 rpm | >600 Nm peak, >75 kW peak, Max speed >3000 rpm | 2 to 200 |
| Medium Duty Truck (10,000 to 14,000 lbs) | 9.3 L, 294 kW@2000 rpm, 1750 Nm@1400 rpm | >650 Nm peak, >75 kW peak, Max speed >3000 rpm | >300 Nm peak, >50 kW peak, Max speed >3000 rpm | 2 to 150 |
| Light Duty Truck (6000 to 10,000 lbs) | Less than 6.7 L, 290 kW@2800 rpm, 1150 Nm@1600 rpm | >550 Nm peak, >75 kW peak, Max speed >3000 rpm | >200 Nm peak, >50 kW peak, Max speed >3000 rpm | 2 to 100 |
| Light Duty Truck/Car (4000 to 6000 lbs | Less than 6.2 L, 350 kW@4200 rpm, 640 Nm@6000 rpm | >300 Nm peak, >50 kW peak, Max speed >4000 rpm | >150 Nm peak, >25 kW peak, Max speed >4000 rpm | ½ to 100 |
| Extra Light Duty Vehicle (less than 4000 lbs) | Less than 1.0 L to 0.5 L engine (gasoline, Diesel or natural gas), 50 kW@5000 rpm or less -- | >200 Nm, peak >50 kW, peak Max speed 4000 rpm | >150 Nm, peak >25 kW, peak Max speed >4000 rpm | ½ to 100 |

As was mentioned, advanced powertrain 350 may comprise a plurality of components—e.g., electric motors, clutches, actuators, Continuously Variable Transmission (CVT), planetary gearing transmissions and the like. In particular, FIGS. 4A through 4D disclose four particular advanced powertrains 400, 450, 460, and 470, respectively. Common components of these four embodiments comprise engine 402, clutch 1 (414), electric motor M1 (416), clutch 2 (418), electric motor M2 (412) and drive shaft 406. It is appreciated that either clutch 1 (414) and/or clutch 2 (418) may be a torque converter with a lock up clutch as found commonly in modern automatic transmissions.

As may be seen and is further discussed in commonly owned patent application Ser. No. 13/762,731, entitled "SYSTEMS AND METHODS FOR IMPLEMENTING DYNAMIC OPERATING MODES AND CONTROL POLICIES FOR HYBRID ELECTRIC VEHICLES", these components are mated mechanically and may be controlled with a set of robust operational modes. Such robust operational modes (e.g., All Electric Mode, Parallel Hybrid Mode, Series Hybrid Mode and their transitions between them) provide for a vehicle with sufficient power, range, acceleration, fuel economy to provide sufficient owner satisfaction—e.g., to match or exceed conventional drivetrain performance.

For example, these driving modes including: electric drive, parallel hybrid drive, and series hybrid drive and any combination of those may be realized by the combination of one or more motors, generators, and clutching systems which can operate as EV, parallel hybrid, or series hybrid, or a combination thereof through applying electric power and the opening and closing of clutches (possibly by actuators 415 or other mechanisms) via software control provided under the control of a central drivetrain supervisory controller or under the control of a transmission controller.

Both motors may function as traction motors (i.e., a High Torque Electric Mode) or, alternatively, electrical generators (i.e. a High Regeneration Mode) at any given time—e.g., depending on the drive cycle, vehicle status and the power/torque needs of the driver. They can be combined to operate as traction motors or one or more may be used as a generator for typical charging needs or multi-generator for fast charging needs. Clutches may be software controlled so that the system can automatically shift between EV, parallel, series, or full charging modes with or without driver participation. The clutches may be dry or wet clutches and may be electromechanically, hydraulically, mechanically and/or manually actuated.

Control systems may comprise algorithms and methods to speed match motors and generators in order to maximize clutch and clutch material life and also to promote the best driver experience through reducing torque transients or other tactile events back to the vehicle and/or driver. Control systems may also comprise algorithms for controlling motor and generator speeds and closely matching those prior to engaging clutch systems. The speed synchronization may be accomplished through software commands or through using internal speed sensing and/or control components. The system may also be manually controlled with automatic clutch synchronization.

In addition to having common components, the four powertrain embodiments seek to fit onto the vehicle platform with a substantially same dimensioning as with the conventional powertrain. In addition, it may be desirable for advanced powertrains to have substantially similar geometries. Thus, advanced powertrains may be designed to have the same general size and shape as a conventional internal combustion engine and transmission combinations. This tends to facilitate the production of advanced powertrains in existing vehicle designs without having to make major modifications to those vehicles. As such, these advanced powertrains tend to save time to market, reduce development cost and may allow for retrofitting or repowering existing conventional vehicles with EV, Parallel HEV, and Series HEV functionality.

Figure 4A:
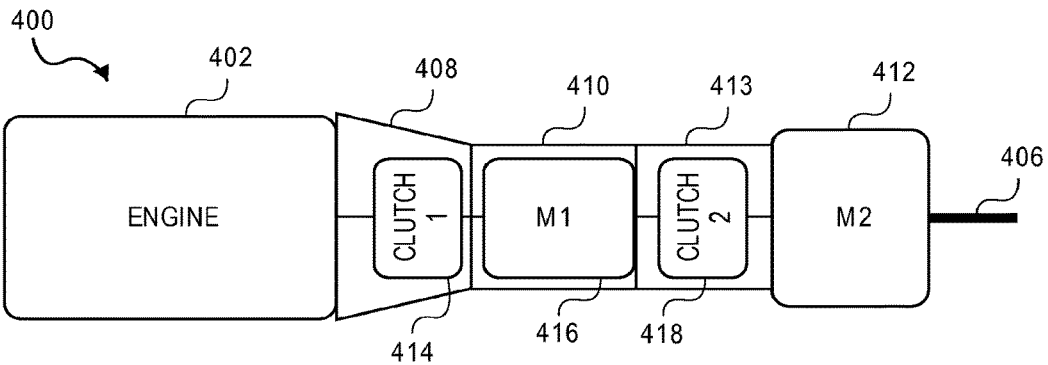
FIGS. 4A through 4D depict various embodiments of powertrain configurations made in accordance with the principles of the present application.
Figure 4B:
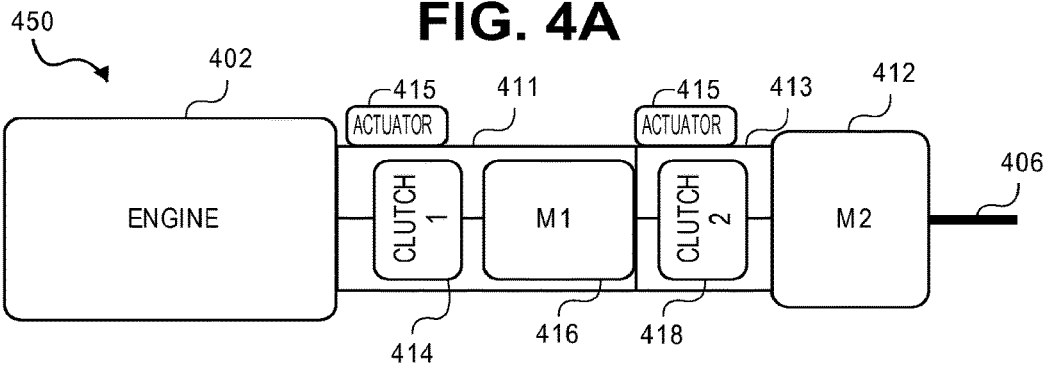
Figure 4C:
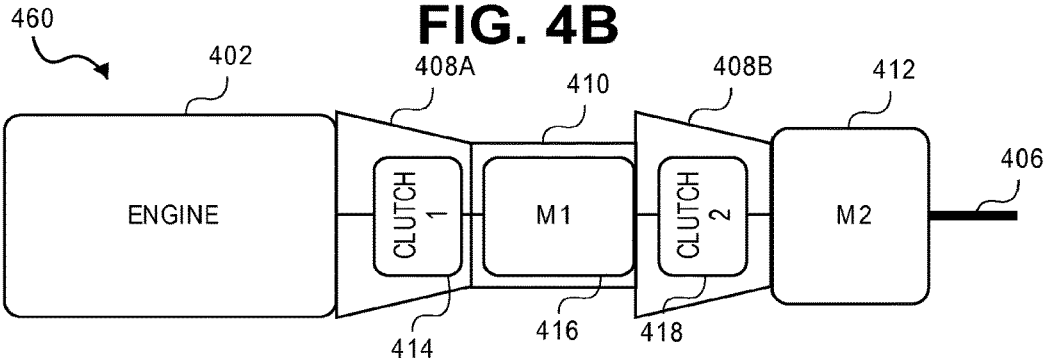
Figure 4D:
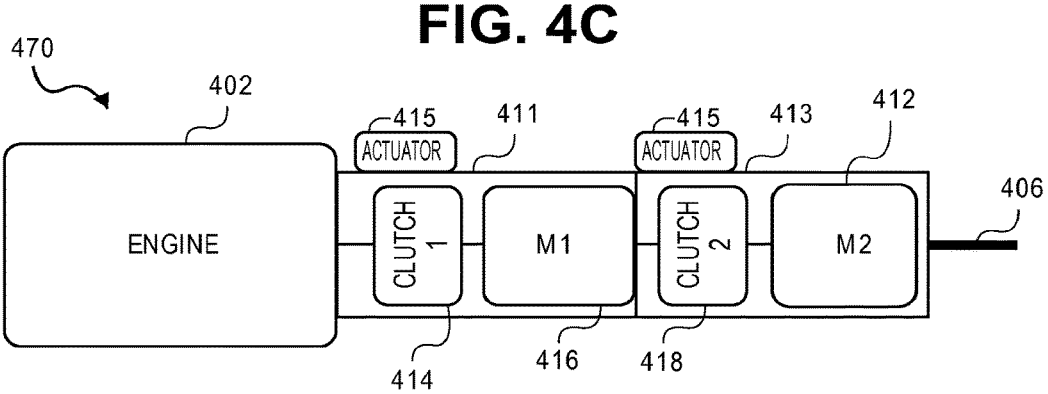

There are many possible geometries to possibly employ. For example, in the embodiment of FIG. 4A, it may be desirable to have a housing comprising a tapered section and/or bell housing 408, a middle section 410 and an end section 413. This housing may cover clutch 1, M1, clutch 2—and possibly M2, as desired. Middle section 410 may tend to relieve strain on M1's case as well. FIG. 4B depicts the housing without a taper—but having actuators 415 on the outer surface of the housing (e.g., either separately mounted or integral to the housing). In FIG. 4C, there may be common tapered sections/bell housing 408a, 408b. Alternatively, there may be no tapered sections and all components housed in one or multiple sections, such as depicted in FIG. 4D.

One Embodiment

Figure 5:
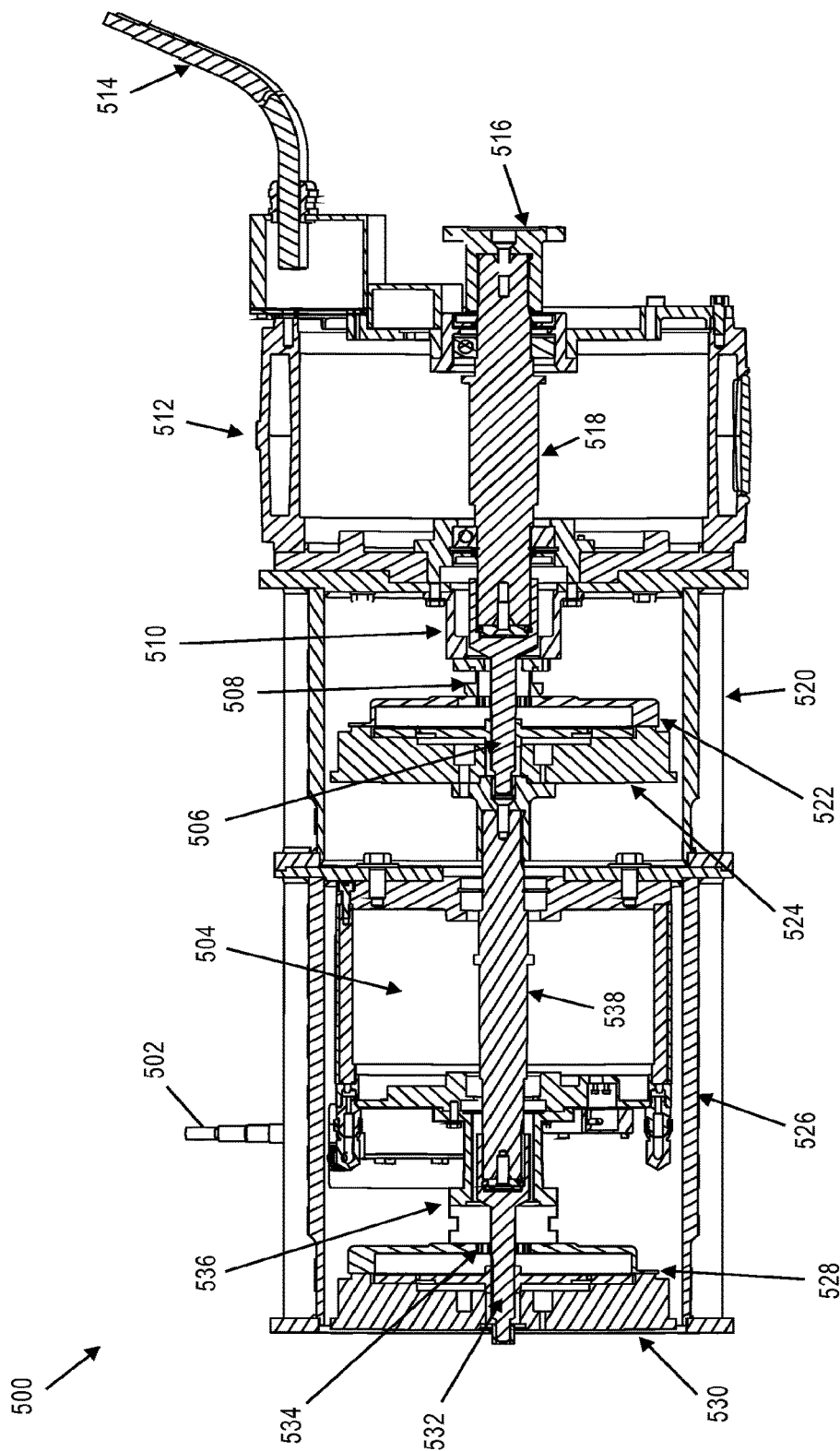
FIG. 5 shows a cross-sectional view of one possible powertrain made in accordance with the principles of the present application.

FIG. 5 shows a cross sectional view of one possible embodiment of an advanced powertrain 500, as made in accordance with the principles of the present application. Powertrain 500 comprises various components such as EM1, EM2, clutch 1, clutch 2. Starting from left-to-right, adapter shaft 532 may extend from housing 520 and be used to mate powertrain 500 to an engine (not shown in FIG. 5). Clutch 1 may comprise flywheel 530, clutch/pressure plate 528, release bearing 534, release bearing mount 536. Adapter shaft 532 is mechanically mated to a through-shaft 538 in EM 1 (504). In one embodiment, EM1 may be mated to housing 526 by any means known in the art (e.g., bolts, welds, or the like). EM1 may be electrically mated to the powertrain via a 3-phase port (502). For cooling purposes, cooling fluids may also be passed through port 502.

Through-shaft 538 of EM1 may be mechanically mated to adapter shaft 506 via clutch 2. Clutch 2 may itself comprise a flywheel 524, clutch/pressure plate 522, release bearing 508 and release bearing mount 510. In this embodiment, clutch 2 is also contained with housing 520. Both Clutch 2 shaft 506 and Clutch 1 shaft 532 may have a sealed long life "pilot" bearing mounted in flywheels 524 and 530 respectively. These bearings may be used for the purposes of alignment and may not have to carry a radial load. EM2, as shown in FIG. 5, may be mechanically mated to housing 520 via any means known in the art. EM2 (512) may comprise through-shaft 518 and may be electrically mated to the powertrain via 3-phase port 514. Power from powertrain 500 may be further communicated to the rear via an adapter flange 516 to a driveshaft (not shown).

Various Housing Embodiments

In many of the embodiments disclosed herein, there is a housing to which various components are mechanically mated—e.g., EMs, clutches, actuators and the like. In one embodiment, a suitable housing may comprise a tubular structure which provides suitable mounting, interconnection, environmental, installation, and operational functions. Housings may be designed to conform to traditional vehicle body styles such the advanced powertrain may be fitted into existing and/or conventional transmission tunnels and/or vehicle frames.

In many embodiments, a housing may provide physical protection and component reinforcement structure—designed to provide protection against road hazards, water, blasts (e.g., for military applications). A housing may also serve as the structural part of the system—thereby minimizing stress on motors, generators, clutch systems which could be experienced from the vehicle dynamics, frame and body twisting or bending, etc. In addition, a housing may also extend the life and durability of motors, generators, and clutch components. A housing may also allow the use of lighter duty components that may not need to be designed to survive all the vehicle torsional and dynamics via their own design.

The housing may desirable allow for radially and axially aligning of components, such as clutch components, flywheels, electric motors, electric generators with respect to each other for ease of assembly and long term reliability and may also comprise physical mounting interface for an internal combustion engine and a propeller shaft or other power transmission device.

In other embodiments, housing may be structurally reinforced with tubular shape and stiffening ribs (not shown) in order to minimize flex of the assembly with reduced system weight. In addition, housing may provide suitable interface for software controlled clutch actuators—which may be any means known in the art, e.g., mechanical, electrical, pneumatic, or any combination of those.

In one embodiment, the housing may be of modular design—whereby the housing may not necessarily be of a unitary design (i.e., housing all or substantially all of the various components of the powertrain). It may be possible that the housing comprises different portions—where one portion may house or otherwise contain one or more of the components of the powertrain (and, possibly, without regard as to whether any of the components come stocked with their own separate housing structure). It may be possible that the portions cover and protect one or more such powertrain components. In addition, each of these portions may be mechanically mated to each other (e.g., by bolts, screws, welds or the like). Alternatively, each portion may be mechanically mated to the vehicle itself and the portions placed such that each provides protection to one or more components of the powertrain.

Electro-Magnetic Compatibility (EMC)

Another aspect to a housing which may be common to one or more components of the powertrain is the ability to provide a degree of EMC. It is known in the art of power electronics that Electro-Magnetic Interference (EMI) and Radio-Frequency Interference (RFI) issues are potentially present in such a powertrain design.

Thus, in many embodiments of the present application, it may be desirable to have the housing as a structure that may provide a high integrity, common electrical ground for motors and generators and other electronics requiring low impedance path to ground and a common ground to other components. To provide possible EMC, the housing may comprise the use of materials for attenuating both E field and H field radiated emissions. For example, one embodiment may uses Aluminum—which may itself be overplated with copper and Nickel or Chrome. Other embodiments may include other layering possibilities or materials to provide such suitable EMC profiles. In addition, electrical and control cables routed to the housing structure may comprise effectively grounding gross cable shields to minimize interference from radiated emissions.

Cooling Systems and Management

Figure 6:
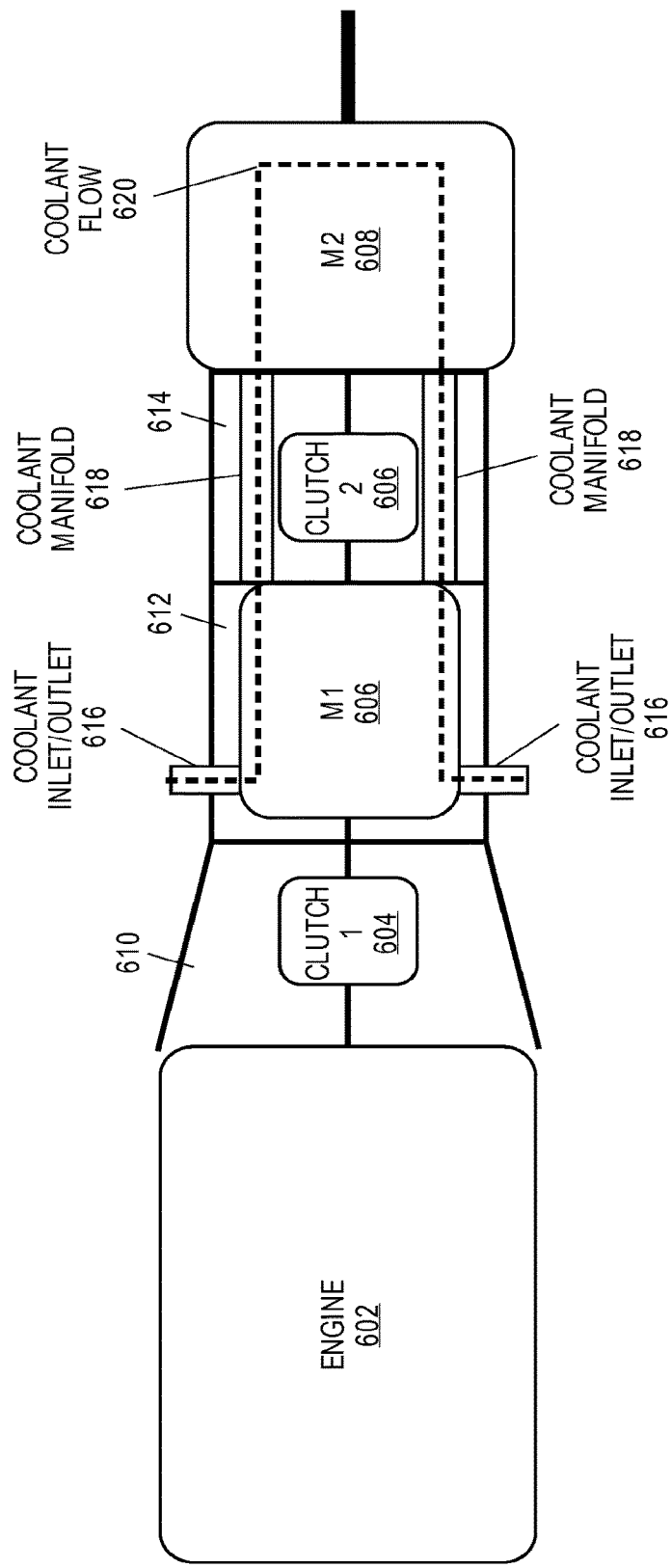
FIG. 6 depicts one embodiment of a powertrain and its associated cooling loop made in accordance with the principles of the present application.

FIG. 6 is one embodiment of a cooling and/or thermal management system made in accordance with the principles of the present application. Cooling system may be incorporated into housing 610 comprising cooling inlet/outlet ports 616 that input and output cooling fluid, routing through Motor 1 (612), through a coolant manifold 616 past clutch 2, and through Motor 2 (608). It may be the case that Motors 1 and/or 2 may have cooling manifolds built-in from the manufacturer—and if so, the present cooling system may seek to use these existing manifolds. If not, other manifolds may be constructed to be in thermal communication with the motors in order to provide sufficient cooling.

As may be seen, coolant manifold 616 may be constructed to be in thermal communication with Clutch 2—in order to move heat away from the clutch. It will be appreciated that another coolant manifold may be similarly constructed to cool Clutch 1.

In such embodiments, it may be desirable to include cooling pathways to provide for heat sinking the motors-generators and other components together to reduce thermal gradients throughout the system and to promote better cooling when the system is shut down and no longer has cooling fluid being pumped through the components. Such cooling pathways and cooling manifolds may comprise pipes and/or conduits (or other such plumbing) to connect to one or more radiators (not shown) to rid the system of excess heat.

In other embodiments, it may be desirable to include cooling pathways to ensure that components are not too cool for optimal operation. Heat management (i.e., whether cooling or heating components) may be applied to the batteries, the motors, clutches, electrical controllers and any other heat-generating or heat-sensitive elements. It is desirable to have all such components operating at the most efficient temperature range—which may differ from each other. In such cases, it may be desirable to route heat from components that are in need of cooling to components that may be in need of heating.

Other Configurations and Embodiments

Apart from the rear-wheel drive configuration shown in previous figures, it may be desirable to use this powertrain to power front-wheel drive (FWD) or all-wheel drive (AWD) configurations.

Figure 7:
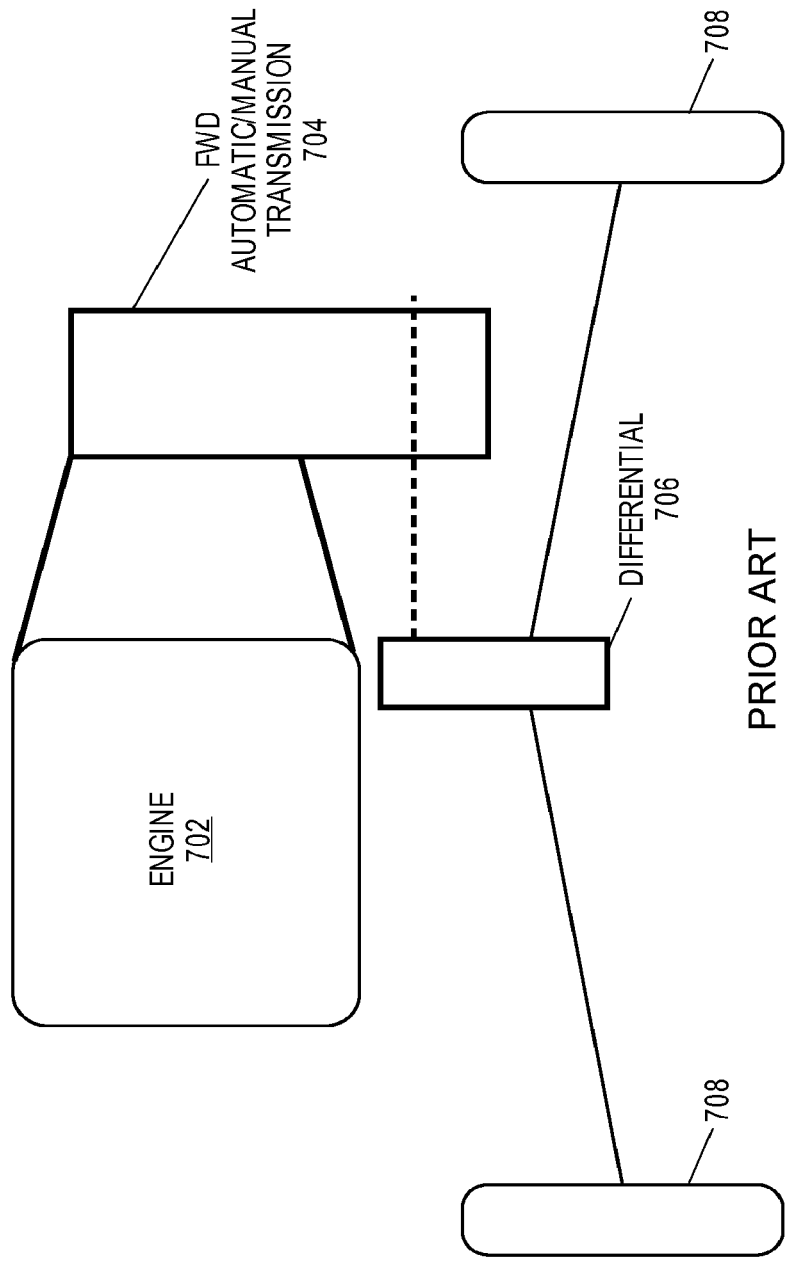
FIG. 7 depicts a conventional powertrain for a front wheel drive vehicle.
Figure 8:
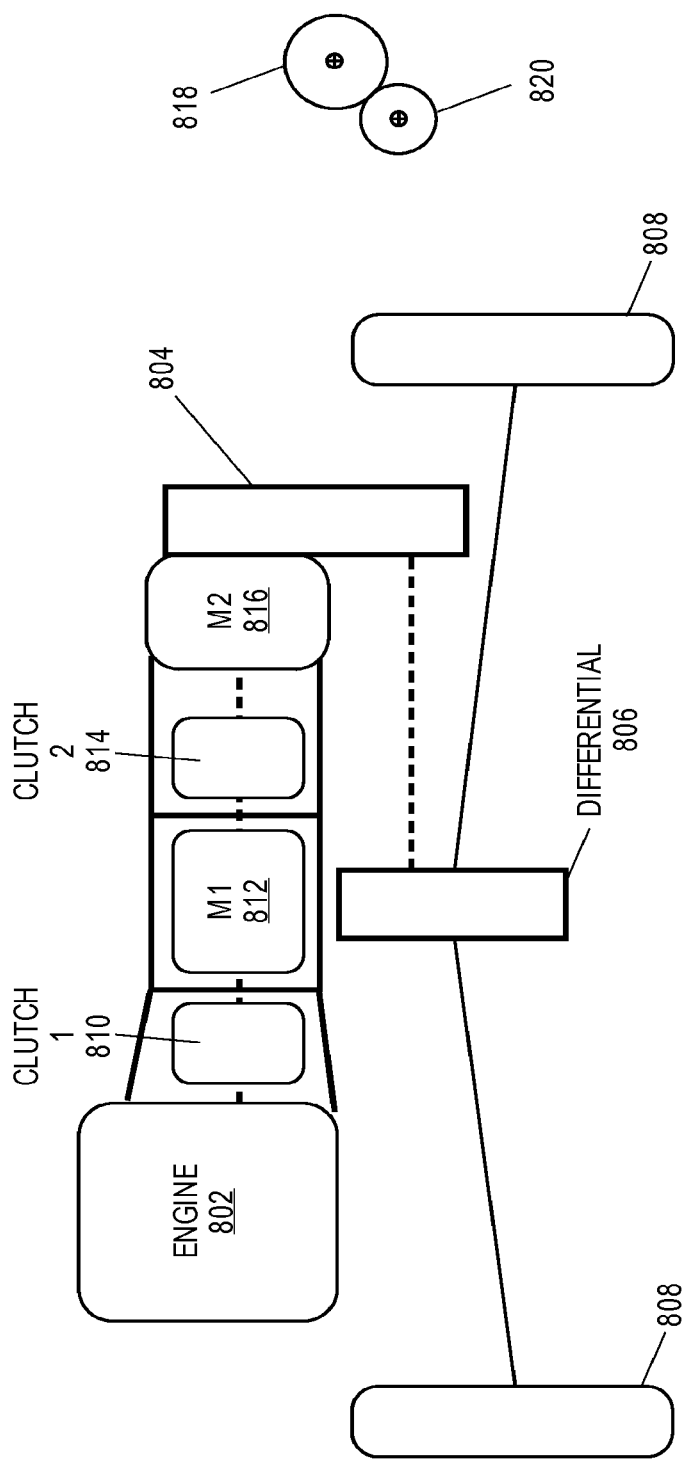
FIGS. 8 and 9 depict embodiments of front wheel drive powertrains made in accordance with the principles of the present application.

FIG. 7 shows a conventional powertrain that comprises an engine 702, FWD transmission 704 and a differential 706—in mechanical communications with wheels 708. To contrast with this conventional powertrain, FIG. 8 shows one embodiment of powertrain which may be suitable for FWD applications. Engine 802 may be mated to Clutch 1 (810), Motor 1 (812), Clutch 2 (814) and gearing 804. Gearing 804 may provide suitable transmission from the mid-to-rear portion of the vehicle to the front wheels. Gearing 804 may be affected by gears 818 and 820, as depicted. The transmission of power and/or torque may thereafter be delivered to the differential 806 and, thus, to front wheels 808. It should be appreciated that the gear set 818, 820 may be replaced by a power chain and sprockets. This substitution may be dependent on the direction of rotation of the components.

Figure 9:
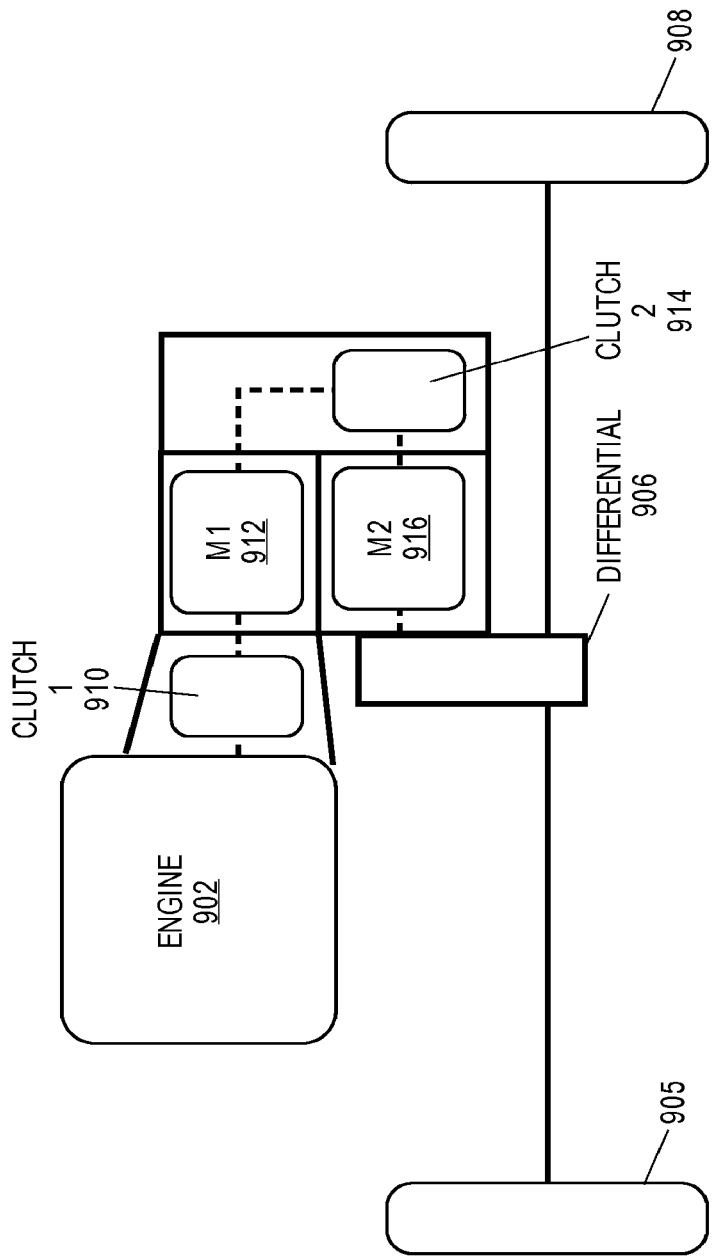

FIG. 9 is yet another embodiment of a FWD configuration. It may be seen engine 902 is connected to clutch 1 (910) which may be coupled to through shaft motor M1 (912) whose shaft may be connected to a sprocket and chain set to another sprocket connected to clutch 2 (914). Clutch 2 (914) may be mounted on motor M2 (916) whose through shaft is connected to the differential gear set 906. It should be appreciated that the described sprocket and chain set may be replaced by gears as in FIG. 8. In addition, clutch 2 (914) may be mounted on Motor M1 instead of Motor M2 for the same function.

Many of the embodiments herein may have its housing be designed for physical protection of the components contained therein and be a reinforcement structure which may be designed to provide protection against road hazards, water, blasts (e.g., military or civilian protections applications). Also, the housing may serve as a structural part of the system thereby minimizing stress on motors, generators, clutch systems which could be experienced from the vehicle dynamics, frame and body twisting or bending, etc. With a robust housing, such a design may tend to extend the life and durability of motors, generators, and clutch components and/or allow the use of lighter duty components that may not need to be designed to survive all the vehicle torsional and dynamics via their own design. In addition, the housing may be designed to be water-tight for amphibious applications or to allow the use of lower cost non-environmental components.

Four Wheel Drive Configuration

The conventional 4WD vehicle system generally consists of an engine, a transmission (automatic or manual) and a transfer box that takes the transmission output shaft and adds an output to the front or rear axle. These transfer boxes consists of clutches, gears or chains and a differential to split the torque so that the front wheels and the rear wheels are receiving an equal or slightly different torque.

The differential may be employed because the front wheels are generally turning at a slightly different speed than the rear wheels. This speed differential is determined by the torque applied, the road conditions and the vehicle load distribution from front to rear.

So if no center differential gear system were used (e.g., as in 4WD army trucks of 60 years ago), the differential speed between the front and rear axles would cause the drive shafts to wind up until the tires slip. This causes very poor controllability and directional stability as well as very high power transfer losses on dry roads. However, in off-road surfaces such as mud, loose dirt or snow and ice, this may not be too much of a problem. This problem can only be solved by having independent torque control of both the front and rear axles with no mechanical connection between them. With the two motors in the many embodiments of the present application, it may be possible to provide independent torque control of the front and rear axles and remove substantially any mechanical connection between the front and rear wheels—thus providing much higher fidelity control of torque applied to the front and rear axles and even to compensate the handling characteristics due to load distribution.

In one embodiment, this may be done by proportioning the torques according to front and rear loading automatically if the axle loads were sensed.

Figure 10:
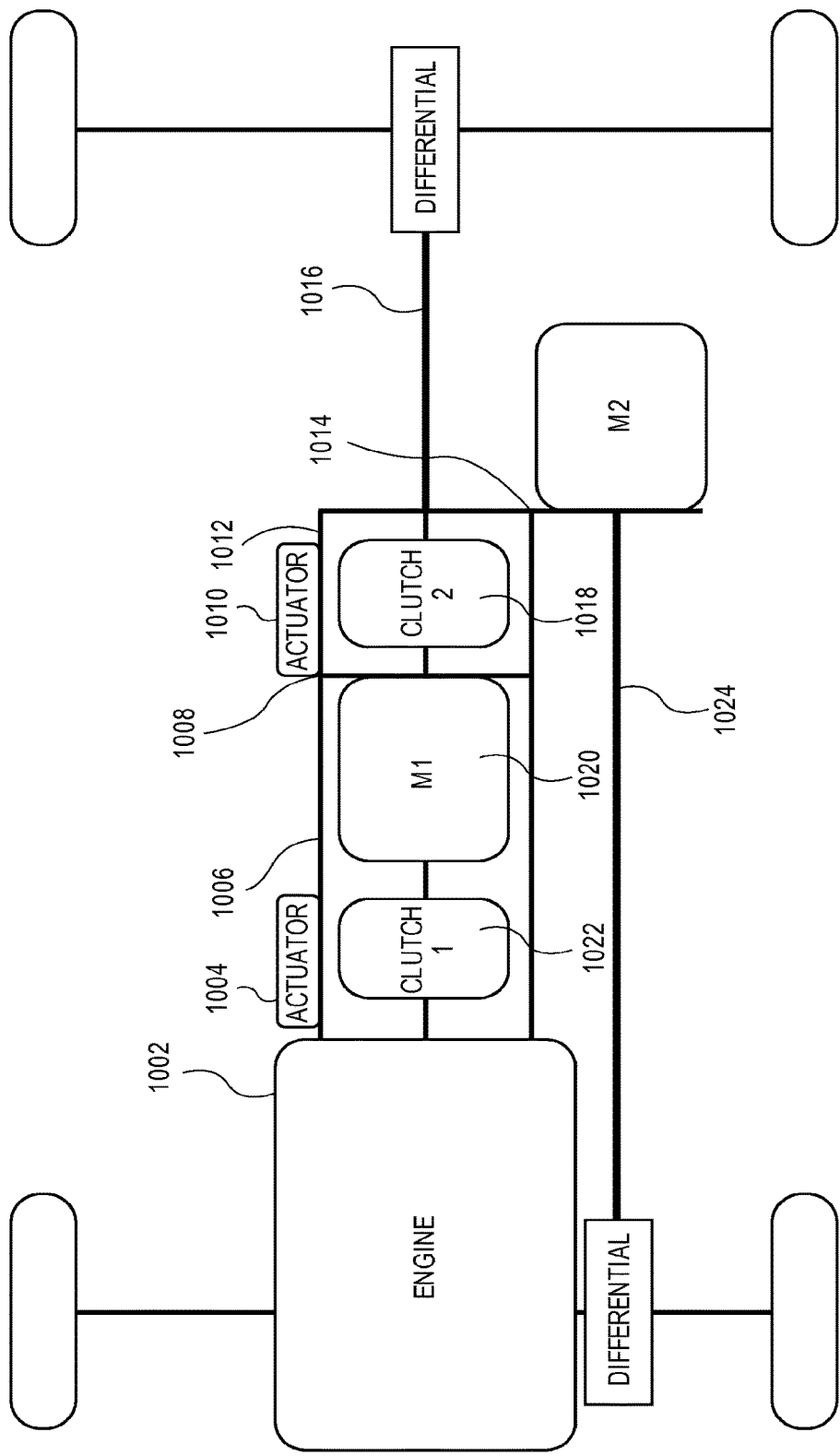
FIGS. 10 and 11 depict embodiments of four-wheel drive powertrains made in accordance with the principles of the present application.

In FIG. 10, one four wheel drive (4WD) powertrain embodiment is depicted that comprises a two-motor, two clutch system. This 4WD system affects this configuration by separating the two motors—one driving one set of wheels (e.g., front wheels) and the other motor driving the other set of wheels (e.g., the rear wheels). In particular in FIG. 10, a common driveshaft 1016 hosts engine 1002, clutch 1 1022 (and associated actuator 1004), Motor 1 1020, clutch 2 1018 (and associated actuator 1010). Motor 1 and the clutches 1 and 2 are housed in housing 1006, as discussed above. In addition, bulkheads 1008 and 1014 may aid to mount Motor 2.

As may be seen in this embodiment, Motor 2 drives the front wheels via driveshaft 1024 and the differential on the front wheel axle—while Motor 1 drives the rear wheels through the same clutch mechanism and driveshaft 1016 and a rear wheel axle differential. In one embodiment, there may be added only the incremental cost of a differential placed on the front wheel axle. In one embodiment, the control of the two motors may be the same in the 4WD configuration as in the 2WD—as the shaft between motor 1 and motor 2 may effectively be replaced by the road surface between the front and rear axles. It may be possible to employ such axle mechanisms off-the-shelf. It should be appreciated that the drive shaft lengths may be adjusted to suit any particular situation.

Another embodiment/configuration may comprise an extra mounting plate to hold Motor 2 and a bearing for the rear universal joint from Clutch number 2. Another embodiment/configuration may be to use two motors on the front wheels—and the drivetrain may then become a 3 motor drive system. This configuration may have affect front directional vector control—providing slightly different torque on the right and left wheels on that axle.

Figure 11:
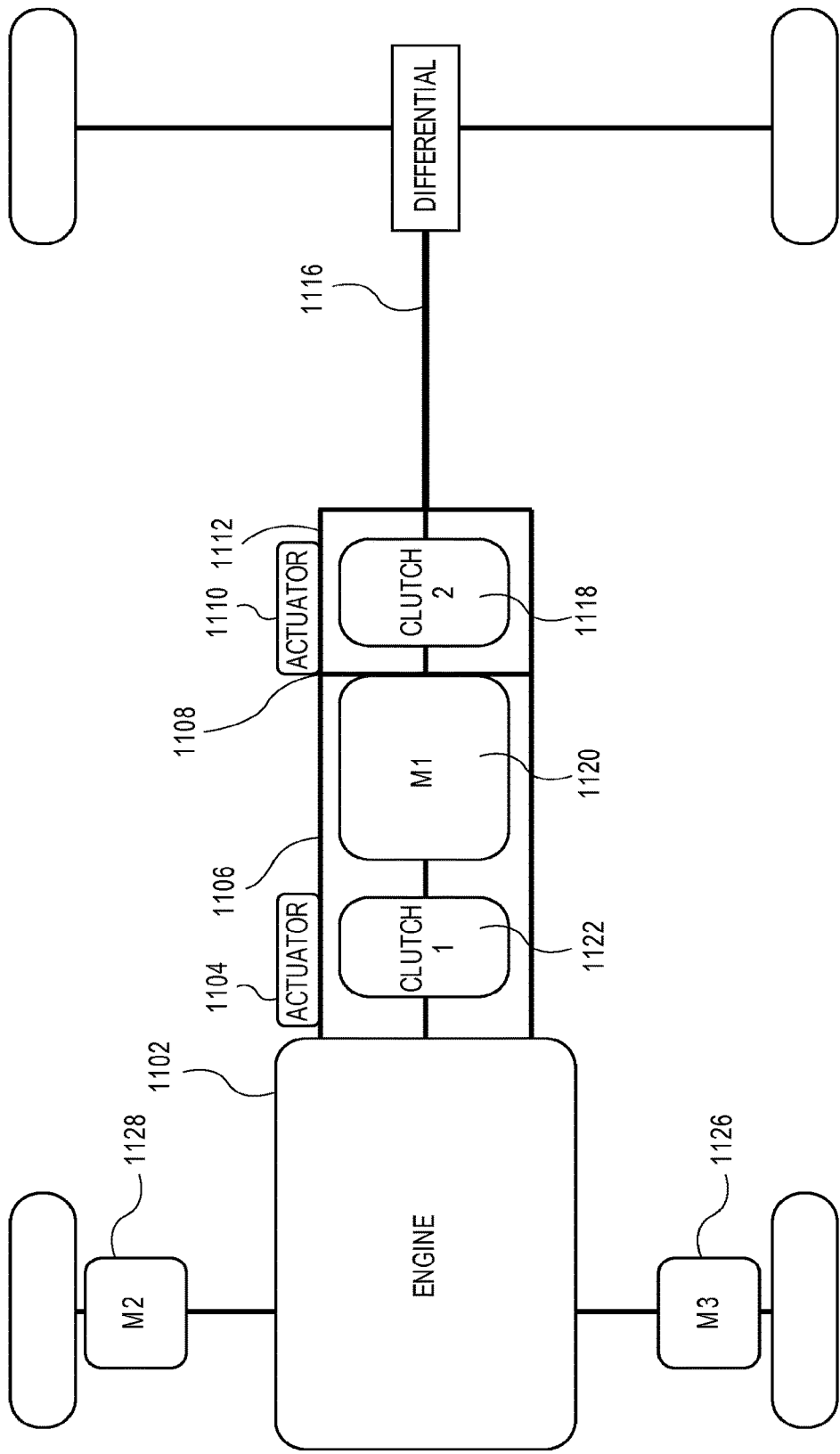

In another embodiment/configuration, there may be other ways to electrically control right and left torque using two motors at each front wheel and replace the front driveshaft and front differential components. FIG. 11 depicts one such embodiment. The powertrain of FIG. 11 may comprise: engine 1102, actuators 1104 and 1110, clutches 1 and 2 (1122 and 1118), Motor 1 (1120), housing 1112, bulkheads 1108, and driveshaft 1116 (e.g., connected to a differential (on either rear or front axle).

As may be seen, two additional motors (M2 and M3, 1128 and 1126 respectively) may be coupled to the front (or, alternatively rear) axle to provide drive to the wheels. In another embodiment, a single engine may be mounted on the axle to provide the drive to the wheels—if the axle is mechanically connected to both wheels.

In one configuration, the ratio of the front axle and the rear axle reduction gears to the wheels do not have to be the same since the electric motors may now be running independently of each other—rather than be tied to the same shaft as the engine in a 2WD system. As mentioned, the connection between the two motors may be provided through the road. In an alternative embodiment, a 4WD configuration may be done with the addition of a transfer box.

In addition, different ratios for front and rear axle assemblies may result in higher performance with the same motors as used in the 2WD system previously disclosed—even if the two sets of motors have substantially the same power and torque capability.

Slip control between the front and rear axles may be controlled accurately to maintain good vehicle stability under most or all road conditions in this 4WD powertrain that may not be currently possible with mechanical 4WD systems. This may tend to lead to a much more robustly stable and controllable 4WD system.

In another embodiment, an off-road 4WD configuration may be possible. In this configuration, the powertrain (e.g., of FIGS. 10 and/or 11, or other configuration) may comprise two speed axles, currently on the market. These axles may be shifted into low gear or high gear while the vehicle is stopped at the axle. The two speed axles may be shifted together or individually and the configuration may detect the difference and compensate. This may give the 4WD capability to crawl at low speeds and climb rocks as well as be able to cruise with 4WD at high speeds in snow and ice safely.

Figure 12:
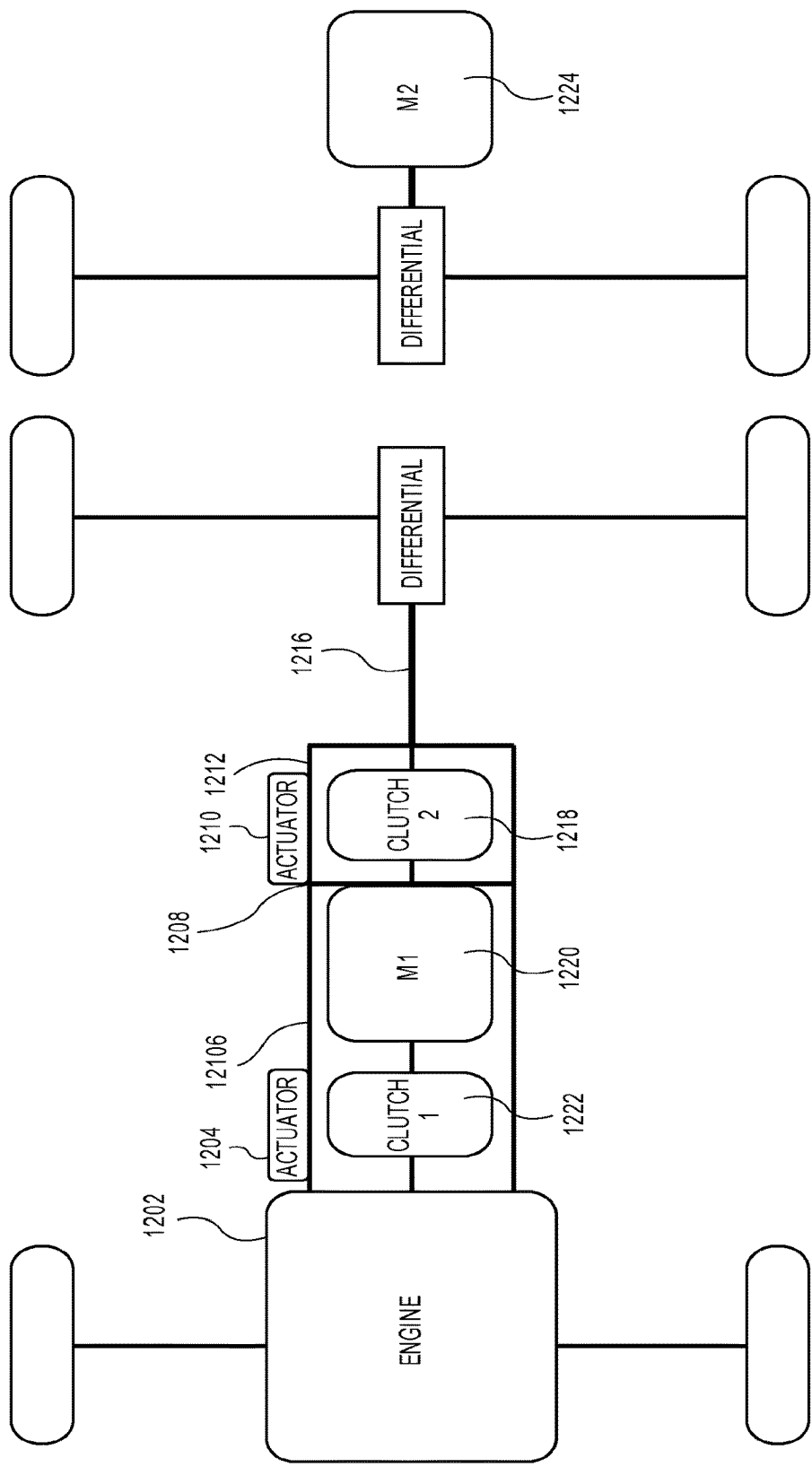
FIG. 12 depicts one embodiment of a multi-axle, multi-wheel powertrain made in accordance with the principles of the present application.

In other embodiments, it may be desirable to have a multi-wheel drive powertrain configuration. FIG. 12 is one embodiment of such a configuration. As before, the powertrain may comprise: engine 1202, actuators 1204 and 1210, clutch 1 and 2 (1222 and 1218), Motor 1 1220, housing 1212, bulkhead 1208. This portion of the powertrain may be mechanically coupled to a first axle (as shown connected via an optional first differential) via a first driveshaft 1216. Motor 2 (1224) may be connected to another axle (e.g., of a multi-axle vehicle, such as 3 or more axles) via a separate driveshaft and an optional differential. Motor 2 may be controlled by signals from the controller (not shown in FIG. 12)—as is described above.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

The invention claimed is:

1. A four-wheel powertrain for Hybrid Electric Vehicle (HEV) vehicles, said powertrain comprising:
   a first driveshaft, said first driveshaft adapted to be mechanically coupled to a first axle;
   a housing;
   a first clutch and a second clutch, the first clutch and the second clutch positioned in the housing;
   a prime mover, the prime mover mechanically connectable directly to the first clutch;
   a first electric motor-generator positioned in the housing, said first electric motor-generator mechanically coupled directly to said prime mover via the first clutch and directly to said first driveshaft via the second clutch;
   a second electric motor-generator, said second electric motor-generator adapted to be mechanically coupled to a second axle;
   wherein the first and the second electric motor-generators are independently operatable as traction motor-generators; and
   a controller, said controller capable of supplying control signals to said prime mover, said first clutch, said first electric motor-generator, said second clutch and said second electric motor-generator such that said controller is capable of dynamically affecting a plurality of operating modes.

2. The powertrain of claim 1 wherein said HEV vehicle is one of a group, said group comprising: a hybrid electric vehicle and a plug-in hybrid electric vehicle.

3. The powertrain of claim 2 wherein said plurality of operating modes comprises one of a group, said group comprising: all electric mode, high-torque electric mode, series mode, high regeneration mode, series-parallel mode, conventional driving mode and parallel mode.

4. The powertrain of claim 2 wherein said HEV vehicle further comprises an external charger.

5. The powertrain of claim 2 wherein said HEV vehicle further comprises a battery management system.

6. The powertrain of claim 2, wherein said second electric motor-generator comprises:
   a first motor, said first motor mechanically coupled to a first wheel on said second axle; and
   a second motor, said second motor mechanically coupled to a second wheel on said second axle.

7. The powertrain of claim 1, wherein said second electric motor-generator is mechanically mated to said housing via said bulkhead.

8. The powertrain of claim 7, wherein said second electric motor-generator is mechanically connected to a second driveshaft, and said second driveshaft is mechanically connected to said second axle.

9. The powertrain of claim 8 wherein said second driveshaft is mechanically connected to a differential, said differential is mechanically connected to said second axle.

10. The powertrain of claim 7 wherein said HEV vehicle comprises a multi-axle vehicle, said multi-axle vehicle comprises 3 or more axles.

11. The powertrain of claim 1, further comprising the first axle and a first differential driving the first axle, wherein the first electric motor-generator is connected to the first differential by the first driveshaft without a reduction mechanism therebetween driving the first differential.

12. The powertrain of claim 11, wherein the second electric motor-generator is mechanically connected to a second driveshaft, further comprising gearing connected to the second electric motor-generator and driving the second driveshaft.

13. The powertrain of claim 1, further comprising the first axle and a first differential driving the first axle, wherein the first electric motor-generator is connected to the first differential by the first driveshaft.

14. The powertrain of claim 1, wherein the second electric motor-generator is positioned in the housing.

* * * * *